United States Patent
Streltsov et al.

(10) Patent No.: US 7,792,404 B2
(45) Date of Patent: Sep. 7, 2010

(54) GLASS-BASED LASER RIDGES FOR ADHESIVE CONFINEMENT AND RELATED METHODS

(75) Inventors: Alexander Mikhailovich Streltsov, Corning, NY (US); James Scott Sutherland, Corning, NY (US)

(73) Assignee: Corning Incorporated, Corning, NY (US)

( * ) Notice: Subject to any disclaimer, the term of this patent is extended or adjusted under 35 U.S.C. 154(b) by 372 days.

(21) Appl. No.: 11/985,908

(22) Filed: Nov. 19, 2007

(65) Prior Publication Data

US 2009/0130388 A1 May 21, 2009

(51) Int. Cl.
   *G02B 6/42* (2006.01)
(52) U.S. Cl. ......................................... 385/52
(58) Field of Classification Search ................. None
   See application file for complete search history.

(56) References Cited

U.S. PATENT DOCUMENTS

| | | | |
|---|---|---|---|
| 5,877,560 A * | 3/1999 | Wen et al. | 257/778 |
| 6,358,630 B1 * | 3/2002 | Tsukada et al. | 428/646 |
| 6,978,068 B2 * | 12/2005 | Wilson et al. | 385/52 |
| 7,480,432 B2 * | 1/2009 | Grzybowski et al. | 385/52 |
| 2002/0003933 A1 | 1/2002 | Sherrer et al. | 385/83 |
| 2004/0214370 A1 | 10/2004 | Quinones et al. | 438/106 |
| 2005/0127533 A1 | 6/2005 | Odegard et al. | 257/787 |
| 2006/0057773 A1 | 3/2006 | Gross | 438/107 |
| 2007/0201797 A1 | 8/2007 | Grzybowski et al. | 385/52 |

FOREIGN PATENT DOCUMENTS

| | | |
|---|---|---|
| EP | 1020748 | 7/2000 |
| JP | 2004047775 | 2/2004 |

* cited by examiner

*Primary Examiner*—Tina M Wong
(74) *Attorney, Agent, or Firm*—Gregory V. Bean; Michael W. Russell

(57) ABSTRACT

A method for manufacturing an optical assembly comprises providing a first substrate having a first surface, providing a second substrate having a second surface facing the first surface, and forming a patterned microbump on at least a select one of the first surface and the second surface. The method further comprises applying an adhesive to the at least select one of the first surface and the second surface in a region proximate the patterned microbump, and attaching the first substrate to the second substrate by placing the first surface and the second surface in close proximity to one another such that the adhesive contacts both the first surface and the second surface, and wherein the adhesive is held within a preselected area by the patterned microbump.

23 Claims, 2 Drawing Sheets

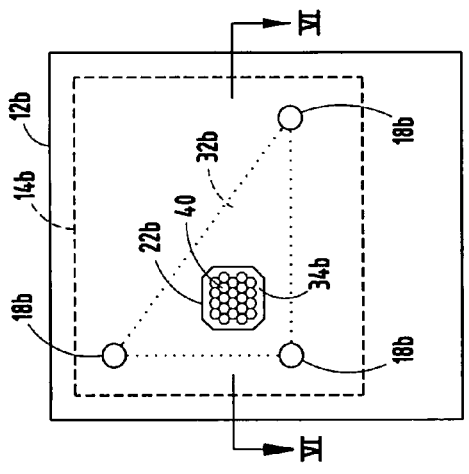
FIG. 4B
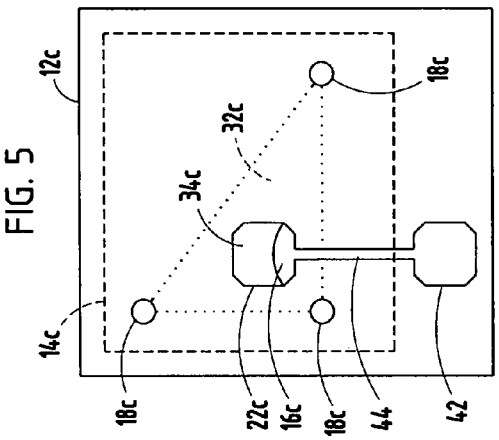
FIG. 5
FIG. 7
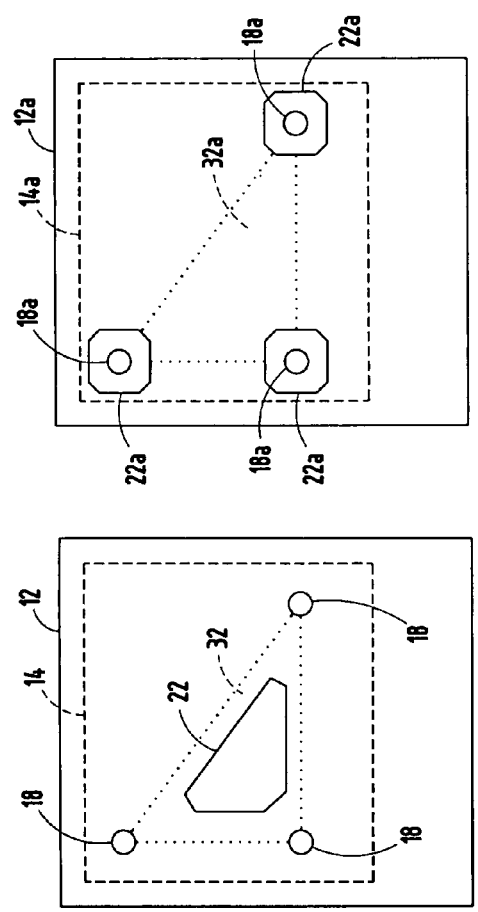
FIG. 4A
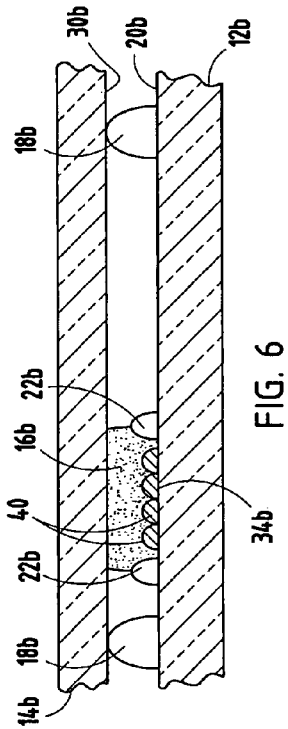
FIG. 6

GLASS-BASED LASER RIDGES FOR ADHESIVE CONFINEMENT AND RELATED METHODS

Parts of this invention were made with government support under Agreement No. H98230-05-C-0429 awarded by Maryland Procurement. The government may have certain rights in some of the claims of the invention.

BACKGROUND OF THE INVENTION

Field of the Invention

The present invention relates generally to optical element micropositioning systems and methods, and in particular to optical elements including glass-based laser ridges for adhesive confinement.

SUMMARY OF THE INVENTION

A first aspect of the present invention is a method for manufacturing an optical assembly that comprises providing a first substrate having a first surface, providing a second substrate having a second surface facing the first substrate, and forming at least one patterned microbump on at least a select one of the first surface and the second surface. The method further comprises applying an adhesive to the at least select one of the first surface and the second surface in a region proximate the patterned microbump, and attaching the first substrate to the second substrate by placing the first surface and the second surface in close proximity to one another such that the adhesive contacts both the first surface and the second surface, and wherein the adhesive is held within a given area by the at least one patterned microbump.

Another aspect of the invention is an optical assembly that comprises a first substrate having a first surface, and a second substrate having a second surface facing the first substrate, wherein at least a select one of the first surface and the second surface includes at least one patterned microbump. The optical assembly further comprises an adhesive located between and in contact with the first surface and the second surface, wherein the adhesive is held within a preselected area by at least a portion of the at least one patterned microbump.

The present inventive method of manufacturing an optical assembly and the resultant optical assembly are compatible with existing laser bump forming processes, and allow arbitrarily-shaped wells and channels to be co-fabricated with laser bumps formed for spacing purposes. The laser ridges or patterned microbumps may be formed relatively rapidly and to the necessary heights, controlled to narrow constraints. Further, the heights of these laser ridges may be set dynamically, based on glass composition variations and upper substrate placement variations. Moreover, the present advantages may be implemented in a wide variety of component types and configurations, provide flexibility in the associated manufacturing process and are particularly well adapted for the proposed use.

Additional aspects, features and advantages of the invention are set forth in the detailed description that follows, and in part, will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated in and constitute a part of the specification. The drawings illustrate various embodiments of the invention, and together with the description serve to explain the principals and operations of the invention.

BRIEF DESCRIPTION OF THE DRAWINGS

FIG. 4A is a top plan view of the base substrate having a plurality of spacing microbumps and a patterned microbump formed thereon, wherein the patterned microbump is configured to retain an adhesive within a preselected area;

FIG. 4B is a top plan view of the base substrate having a plurality of spacing microbumps and a plurality of patterned microbumps formed thereon, wherein the patterned microbumps surround associated spacing microbumps to prevent adhesive from contacting the spacing microbumps;

FIG. 5 is top plan view of the first substrate having a plurality of spacing microbumps, a patterned microbump, and a plurality of gap-filling microbumps formed thereon;

FIG. 6 is a cross-sectional view of the first substrate taken along the line VI-VI, FIG. 7, with the addition of a second substrate and an adhesive placed therebetween; and FIG. 7 is a top plan view of the base substrate with a plurality of the spacing microbump and the patterned microbump formed thereon, wherein the patterned microbumps defines a preselected area within an adhesive zone and an adhesive reservoir zone located outside of the adhesive zone.

DETAILED DESCRIPTION OF THE PREFERRED EMBODIMENTS

Figure 1:
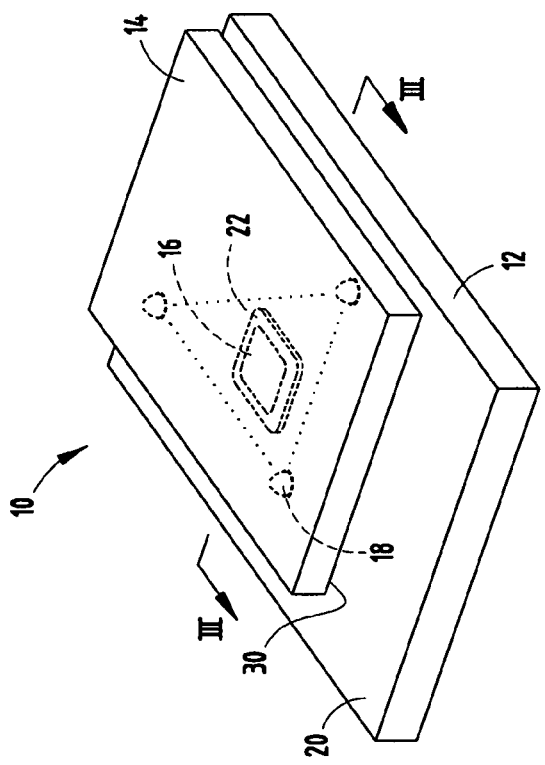
FIG. 1 is a top perspective view of an optical assembly embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are particular embodiments of the inventive concepts defined in the appended claims. Hence, specific dimensions and other physical characteristics relating to the embodiments disclosed herein are not to be considered as limiting, unless the claims expressly state otherwise.

The present invention includes optical assemblies and methods that rely on the formation of one or more microbumps in supporting elements that support optical elements within optical assemblies. In the description below, various methods of forming microbumps in light-absorbing supporting elements are described. This is followed by a description of example embodiments of methods for channeling an associated adhesive within an optical element via the formation of one or more patterned microbumps in the light-absorbing alignment element. Example embodiments of optical assemblies formed using the microbump micropositioning methods of the present invention is also described.

PYREX, as referenced herein, is a registered trademark of Corning, Inc., of Corning, N.Y. The term "microbump" is broadly understood to include various shapes such as circular islands, elongated ridges, etc., as formed in an IR-absorbing glass substrate using the methods described below. The term "optical element" is understood to mean any type of optical component, such as an optical fiber, a planar waveguide substrate, a lens, a microlens, a grating, a beamsplitter, etc. The term "optical assembly" as used herein includes a system or structure that includes optical elements, whether alone or in combination with other types of elements, such as electrical, electro-optical, electromechanical or mechanical elements. The phrase "light-absorbing substrate" is understood to mean a substrate that absorbs light at an absorption wavelength such as at a visible, near-infrared and/or infrared wavelength, wherein local absorption of the light by the substrate at one or more of the absorption wavelengths locally heats the substrate.

The reference numeral 10 (FIG. 1) designates an optical assembly embodying the present invention. In the illustrated example, the optical assembly comprises a base substrate 12, an upper substrate 14, and an optical element (not shown) wherein the base substrate 12 and the upper substrate 14 are coupled to one another via an adhesive 16. The base substrate 12 comprises a light-absorbing material, and preferably an IR light-absorbing glass, such as the family of IR-absorbing PYREX glasses available from Corning, Inc. In the present example, the base substrate 12 includes certain IR-absorbing species such as metal dopants, e.g. Cu, Fe, Co and/or V, that cause the glass to experience a dramatic and local reduction in density when heated rapidly at a given location, resulting in glass expansion. Alternatively, either or both of the substrates 12, 14 may comprise the light-absorbing material. The base substrate 12 may be configured to support the optical element thereon, wherein the optical element comprises optical and electro-optical elements/devices as known in the art.

Figure 2:
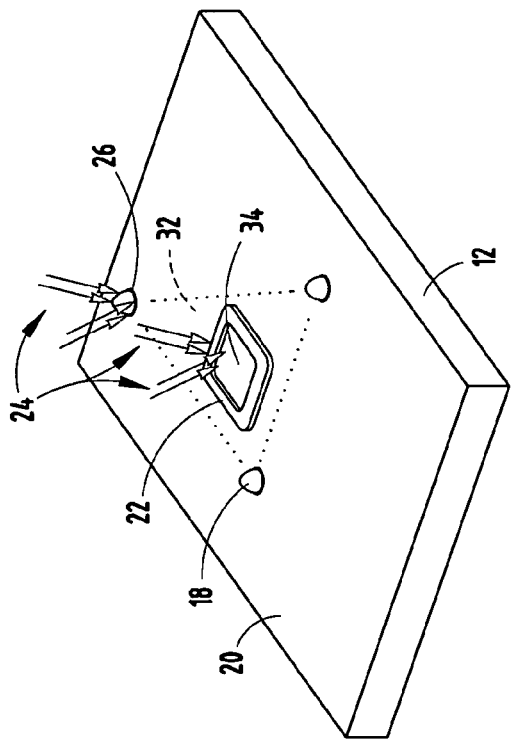
FIG. 2 is a top perspective view of a base substrate including a plurality of spacing microbumps and a patterned microbump formed thereon.

The present inventive process generally includes forming spacing microbumps 18 (FIG. 2) and at least one patterned microbump 22 on an upper surface 20 of the base substrate 12 prior to attachment of the upper substrate 14 to the base substrate 12. In the illustrated example, the base substrate 12 comprises a monolithic light-absorbing glass and may be supported by a movable support stage (not shown) during processing such that the substrate 12 is translatable in the substrate plane relative to either a fixed light or a heat energy source. In a preferred embodiment, the base substrate 12 comprises a glass capable of absorbing light or heat energy in a localized region and in response thereto, rapidly expanding or swelling in the localized heated region.

The method of forming both the spacing microbumps 18 and the patterned microbump 22 on the upper surface 20 of the base substrate 12 includes locally heating the base substrate 12. In the present example, this involves directing a light beam 24 to a localized region of the base substrate 12 as defined by a beam spot 26 formed by the light beam on the upper surface 20 of the base substrate 12. In an example embodiment, the light beam 24 is convergent. The position of beam spot 26 on the upper surface 20 is selectable either by moving the support stage (not shown) or by adjusting the position of light beam 24 or both. In the present example, a laser generating a light beam 24 having an IR wavelength is utilized, such as a $CO_2$ laser that emits radiation (e.g., at 10.6 µm). Alternatively, light beams in the near infra-red wavelength (810 nm) may be utilized, so that the relatively long Rayleigh range of a laser-generated light beam 24 ensures that even minor variations in beam focus do not strongly influence the size of beam spot 26 during stage translation. In another alternative embodiment, the light beam 24 includes at least one of a visible wavelength, an NIR wavelength and an IR wavelength. In an example embodiment, visible wavelengths range from ~400 nm to ~750 nm, NIR wavelengths range from ~750 nm to ~1100 nm, and IR wavelengths include wavelengths in the range from ~1100 nm to ~1680 nm.

The absorption of light by base substrate 12 from light beam 24 locally heats the base substrate 12 and initially raises the temperature of the portion of the base substrate 12 in proportion to intensity of the light beam 24. If the light beam 24 has a circularly symmetric cross-sectional intensity distribution, such as a Gaussian distribution, then the beam spot 24 is circular and the substrate expansion occurs over a circular region as well. Absorption of the light by the base substrate 12 to form the patterned microbump 22 is accomplished by passing the light beam 24 over the upper surface 20 of the base substrate 12 in a set pattern. In both the formation of the spacing microbumps 18 and the patterned microbumps 22, when light beam 24 is locally absorbed by base substrate 12, a limited expansion zone is created within which the rapid temperature change induces a dramatic decrease in density of the base substrate 12. Thus, an example embodiment of the method includes modifying the depth of the expansion zone by adjusting the intensity of the light beam 24, the size of the beam spot 26 and/or the irradiation duration. In an example embodiment, the depth of the expansion zone is changed or made selectable by adjusting the concentration of the IR-absorbing materials in the substrate, as described above.

Since the expansion zone is constrained by unheated (and therefore unexpanded) regions of base substrate 12 surrounding the expansion zone, the substrate material within the expansion zone is compelled to relieve internal stresses by deforming upward, thereby forming the spacing microbump 18 or the patterned microbump 22. In the illustrated example, the surface profile of spacing and patterned microbumps 18, 22 corresponds to the light beam intensity distribution, with the microbump peak corresponding to the location of the highest beam intensity. The light beam 24 may be scanned over any surface of the base substrate 12 and stopped at specific locations so as to form microbumps 18, 22 of various shapes and sizes. Bump profiles of various sizes and shapes can also be formed by adjusting the light beam power, sweep velocity and/or path during the course of the bump forming process for a single bump. In the instant example, the sweep velocity of the light beam 24 over the upper surface 20 of the base substrate 12 when forming the patterned microbump 22 is preferably greater than or equal to 1.0 mm/sec, while the height of the patterned microbump 22 is preferably maintained within 5% of the total height of the microbump 22, more preferably within 3% of the total height of the microbump 22, and most preferably within <0.2 µm.

The method of forming the microbumps 18, 22 further includes fixing the microbump 18, 22 by rapidly cooling the heated region of the base substrate 12. In an example embodiment, this is accomplished by terminating the irradiation of upper surface 20 of the base substrate 12 by the IR radiation beam 24.

The location, spacing distance d, and height h of the patterned microbumps 18, 22 (FIG. 3) are based on a precision characterization of the upper surface 20 of the base substrate 12 and a lower surface 30 of the upper substrate 14. This characterization accommodates typical variations in the upper surface 20 and the lower surface 30 due to the surface mount process. The relative distance d between the upper surface 20 and the lower surface 30 and the height h may each be determined using one or more methods, including: scanning laser profilometry, image analysis of single-image or stereoscopic views of a coupling region; white light interferometric techniques; probing methods that establish offsets by detecting physical contact; and, combinations of these methods, and transversing a probe mounted on a precision stage though a coupling region and imaging the transversal to provide multiple calibration points in a coupling region.

It is noted that a detailed description of the methods and apparatus related to and incorporating the formation of the microbumps within electrical and electro-optical devices is set forth in U.S. patent application Ser. No. 11/365,391, filed Feb. 28, 2006 and entitled GLASS-BASED MICROPOSITION SYSTEMS AND METHODS, which is hereby incorporated by reference herein in its entirety.

Figure 3:
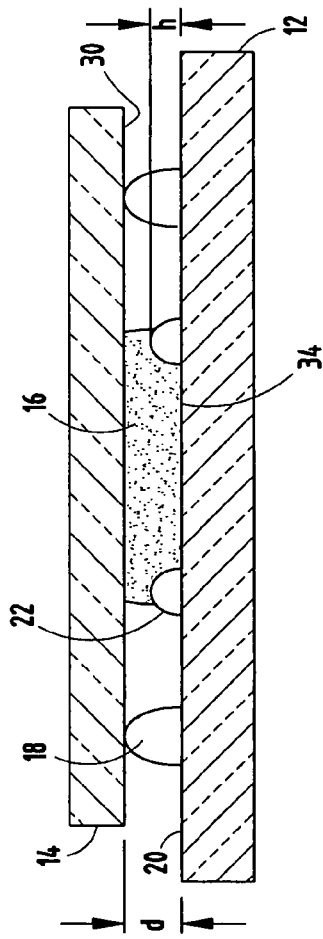
FIG. 3 is a cross-sectional view of the optical assembly taken along the line III-III, FIG. 1.

In the illustrated example, three separate spacing microbumps 18 (FIG. 1) are formed on the upper surface 20 of the base substrate 12, thereby cooperating to form a platform upon which the upper substrate 14 is supported. The spacing microbumps 18 cooperate to define an adhesive zone or region 32 within which the adhesive 16 is preferably contained so as to avoid interference with the spacing microbumps 18, or create other problems with the alignment between the base substrate 12 and the upper substrate 14. The illustrated example further includes a square-shaped patterned microbump 22 that defines a preselected area or adhesive well 34 within the adhesive zone 32 and within which the adhesive 16 is more preferably contained. Subsequent to the formation of the spacing microbumps 18 and the patterned microbumps 22, the predetermined amount of the adhesive 16 is placed within the preselected area 34 and the upper substrate 14 is lowered onto the base substrate 12 until the bottom surface 30 of the upper substrate 14 contacts an rests upon the spacing microbumps 18. As is best illustrated in FIG. 3, the adhesive 16 is contained within the preselected area 34 by the patterned microbump 22. It is noted that the height h of the patterned microbump 22 is slightly less than the height of the spacing microbumps 18, thereby eliminating any interference caused by the abutment of the patterned microbump 22 with the bottom surface 30 of the upper substrate 14. Further, the adhesive 16 is partially contained within the given area 34 by the cohesive properties within the adhesive 16. In the illustrated example, the adhesive 16 includes a thin layer of low-shrinking UV curable and/or thermal curing adhesive.

As described above, the patterned microbumps or adhesive wells 22 may be formed within the adhesive zone 32 to ensure that the adhesive 16 does not wick between the substrates 12, 14 to undesirable locations. While a square-shaped pattern microbump 22 has been described, other shapes and patterns may also be utilized such as that as illustrated in FIG. 4A, wherein a generally triangularly-shaped patterned microbump 22 is located within a triangularly-shaped adhesive zone 32. This generally matched geometrical configuration between the patterned microbump 22 and the adhesive zone 32 prevents the flow of the low-viscosity adhesive 16 away from a central portion of the adhesive zone 32 during the adhesive application, while allowing coverage of a significant portion of the adhesive zone 32 upon assembly of the upper substrate 14 with the lower substrate 12.

Alternatively, laser ridges 22a (FIG. 4B) may be formed around spacing microbumps 18a as a barrier structure to prevent the flow of the adhesive (not shown) into regions surrounding the spacing microbump 18a. It is noted that since the patterned microbumps 22a are similar to the previously-described patterned microbumps 22, similar parts appearing in FIGS. 1-3 and FIG. 4B, respectively, are represented by the same, corresponding reference numeral, except for the suffix "a" in the numerals of the latter. It is further noted that patterned microbumps may also be used to prevent adhesive flow to other regions of the associated substrates, such as those regions that include active or passive electronic or optical components.

Another alternative embodiment includes the formation of a plurality of gap-filling microbumps 40 (FIG. 5) located within the adhesive well 34b as defined by the patterned microbump 22b. As most of the elements in the present example are similar to those as previously described, similar parts appearing in FIGS. 1-3 and FIG. 5, respectively, are represented by the same, corresponding reference numeral, except for the suffix "b" in the numerals of the latter. In the illustrated example, the space-filling microbumps 40 include a plurality of closely-spaced individual microbumps. As is best illustrated in FIG. 6, the space-filling microbumps 40 serve to fill the adhesive well 34b, thereby decreasing the amount of adhesive 16b necessary to fill the adhesive well 34b, and reducing the chances of misalignment due to an excess amount of adhesive being located between the lower substrate 12b and the upper substrate 14b during assembly.

In yet another alternative embodiment, the patterned microbump 22 defines the adhesive well 34c, a reservoir portion 42, and a capillary 44 extending therebetween. In the illustrated example, the reservoir portion 42 is generally square-shaped and is located outside of the adhesive zone 32c, while the capillary 44 provides fluid communication between the adhesive well 34c and the reservoir portion 42. In assembly, the predetermined amount of the adhesive 16c is placed within the reservoir portion 42, and is forced via the capillary 44 into the adhesive well 34c as the upper substrate 14c is lowered onto the lower substrate 12c. Alternatively, the adhesive 16c may originally be placed within the adhesive well 34c with any excess amount of the adhesive 16c being forced into the reservoir portion 42 via the capillary 44 as the upper substrate 14c is lowered onto the lower substrate 12c.

The present inventive method of manufacturing an optical assembly and the resultant optical assembly are compatible with existing laser bump forming processes, and allow arbitrarily-shaped wells and channels to be co-fabricated with laser bumps formed for spacing purposes. The laser ridges or patterned microbumps may be formed relatively rapidly and to the necessary heights, controlled to narrow constraints. Further, the heights of these laser ridges may be set dynamically, based on glass composition variations and upper substrate placement variations. Moreover, the present advantages may be implemented in a wide variety of component types and configurations, provide flexibility in the associated manufacturing process and are particularly well adapted for the proposed use.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

What is claimed is:

1. A method for manufacturing an optical assembly comprising:
   providing a first substrate having a first surface;
   providing a second substrate having a second surface facing the first surface;
   forming at least one patterned microbump on at least a select one of the first surface and the second surface;
   applying an adhesive to the at least select one of the first surface and the second surface in a region proximate the patterned microbump; and attaching the first substrate to the second substrate by placing the first surface and the second surface in close proximity to one another such that the adhesive contacts both the first surface and the second surface, wherein the adhesive is held within a preselected area by the at least one patterned microbump.

2. The method of claim 1, further comprising:
forming at least one spacing microbump on the at least one select surface prior to attaching the first substrate to the second substrate, wherein the at least one spacing microbump has a height that is greater than a height of the at least one patterned microbump.

3. The method of claim 2, wherein the step of forming the at least one spacing microbump comprises forming at least three spacing microbumps that cooperate to define an adhesive zone, and wherein the step of forming the at least one patterned microbump comprises forming at least a portion of the at least one patterned microbump with the adhesive zone.

4. The method of claim 3, wherein the step of forming the at least one patterned bump includes forming the at least one patterned bump as further comprising a reservoir portion located outside of the adhesive zone, and wherein the reservoir portion is in fluid communication with the preselected area.

5. The method of claim 4, wherein the steps of applying and attaching allow excess adhesive to travel between the preselected area and the reservoir portion.

6. The method of claim 2, wherein the step of forming the at least one patterned microbump includes forming the at least one patterned microbump about the at least one spacing microbump.

7. The method of claim 1, wherein the step of forming the at least one patterned microbump includes forming the at least one patterned microbump as a substantially closed pattern that defines an interior surface space, and wherein the step of applying the adhesive comprises applying the adhesive within the interior surface space.

8. The method of claim 1, wherein the steps of providing the first and second substrates include providing at least a select one of the first substrate and the second substrate as being capable of locally expanding when locally heated.

9. The method of claim 8, wherein the steps of providing the first and second substrates include providing the at least select one substrate as comprising a light-absorbing medium, and wherein the step of forming the at least one patterned microbump includes locally irradiating the at least one substrate with a light beam.

10. The method of claim 9, wherein the step of forming the at least one patterned microbump includes providing the light beam in at least a select one of a visible wavelength, a near-infrared wavelength and an infrared wavelength.

11. The method of claim 1, wherein the step of forming the at least one patterned microbump includes forming an elongated microbump.

12. The method of claim 1, further including:
forming at least one gap-filling microbump on at least a select one of the first surface and the second surface and within the preselected area, and wherein the step of applying the adhesive includes applying the adhesive such that the adhesive contacts the at least one gap-filling microbump subsequent to attaching the first substrate to the second substrate.

13. An optical assembly comprising:
a first substrate having a first surface;
a second substrate having a second surface facing the first surface, wherein at least a select one of the first surface and the second surface includes at least one patterned microbump; and
an adhesive located between and in contact with the first surface and the second surface, wherein the adhesive is held with a preselected area by at least a portion of the at least one patterned microbump.

14. The optical assembly claim 13, wherein the at least one patterned microbump comprises an elongated microbump.

15. The optical assembly of claim 13, wherein at least a select one of the first substrate and the second substrate includes at least one spacing microbump having a height that is greater than a height of the at least one patterned microbump.

16. The optical assembly of claim 15, wherein the at least one spacing microbump includes at least three spacing microbumps that cooperate to define an adhesive zone within which at least a portion of the at least one patterned microbump is located.

17. The optical assembly of claim 16, wherein the at least one patterned microbump forms a reservoir portion located outside of the adhesive zone, and wherein the reservoir is in fluid communication with the given area, thereby allowing adhesive to travel between the preselected area and the reservoir.

18. The optical assembly of claim 15, wherein the at least one patterned microbump is formed about the at least one spacing microbump.

19. The optical assembly of claim 13, wherein the at least one patterned bump forms a closed pattern within which the adhesive is located.

20. The optical assembly of claim 13, wherein at least a select one of the first substrate and the second substrate comprises a material capable of locally expanding when locally heated.

21. The optical assembly of claim 20, wherein the material comprising the at least select one of the first substrate and the second substrate comprises a light-absorbing medium.

22. The optical assembly of claim 21, wherein the light-absorbing medium expands when exposed to a light beam comprising at least a select one of a visible wavelength, a near infrared wavelength and an infrared wavelength.

23. The optical assembly of claim 13, further including:
at least one gap-filling microbump located on at least a select one of the first surface and the second surface and located within the preselected area such that the adhesive contacts the at least one gap-filling microbump.

* * * * *